(12) United States Patent
Knowles et al.

(10) Patent No.: US 6,937,425 B2
(45) Date of Patent: Aug. 30, 2005

(54) HEAD-TRACK ALIGNMENT

(75) Inventors: Vernon L. Knowles, Boise, ID (US); Ted A. Brooks, Emmett, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 100 days.

(21) Appl. No.: 10/464,102

(22) Filed: Jun. 18, 2003

(65) Prior Publication Data
US 2004/0257694 A1 Dec. 23, 2004

(51) Int. Cl.[7] .......................... G11B 5/584; G11B 20/20
(52) U.S. Cl. ..................... 360/77.12; 360/76
(58) Field of Search ................. 360/75, 71, 77.01, 360/77.12, 77.13, 77.14, 77.15, 48, 76, 121, 125, 128

(56) References Cited

U.S. PATENT DOCUMENTS

| | | | |
|---|---|---|---|
| 2,938,962 A | 5/1960 | Konins et al. | |
| 5,450,257 A | 9/1995 | Tran et al. | |
| 5,629,813 A | 5/1997 | Baca et al. | |
| 5,982,711 A | 11/1999 | Knowles et al. | |
| 6,141,174 A | 10/2000 | Judge et al. | |
| 6,222,698 B1 | 4/2001 | Barndt et al. | |
| 6,430,008 B1 | 8/2002 | Trabert et al. | |
| 6,744,594 B2 * | 6/2004 | Denison et al. | 360/121 |

* cited by examiner

Primary Examiner—Andrew L. Sniezek

(57) ABSTRACT

A head-track alignment system and method. An embodiment of the system comprises: a head assembly capable of detecting arrival of servo frames in a first and second servo track of a tape; an alignment processor coupled to the head assembly generating a head-track alignment signal based on a comparison of the arrival times of the servo frames in the first and second servo tracks; and wherein the head-track alignment signal can be generated while accessing the tape. An embodiment of the method comprises: determining tape tilt with respect to a head assembly of a tape drive while accessing a tape, and compensating for the tape tilt.

22 Claims, 5 Drawing Sheets

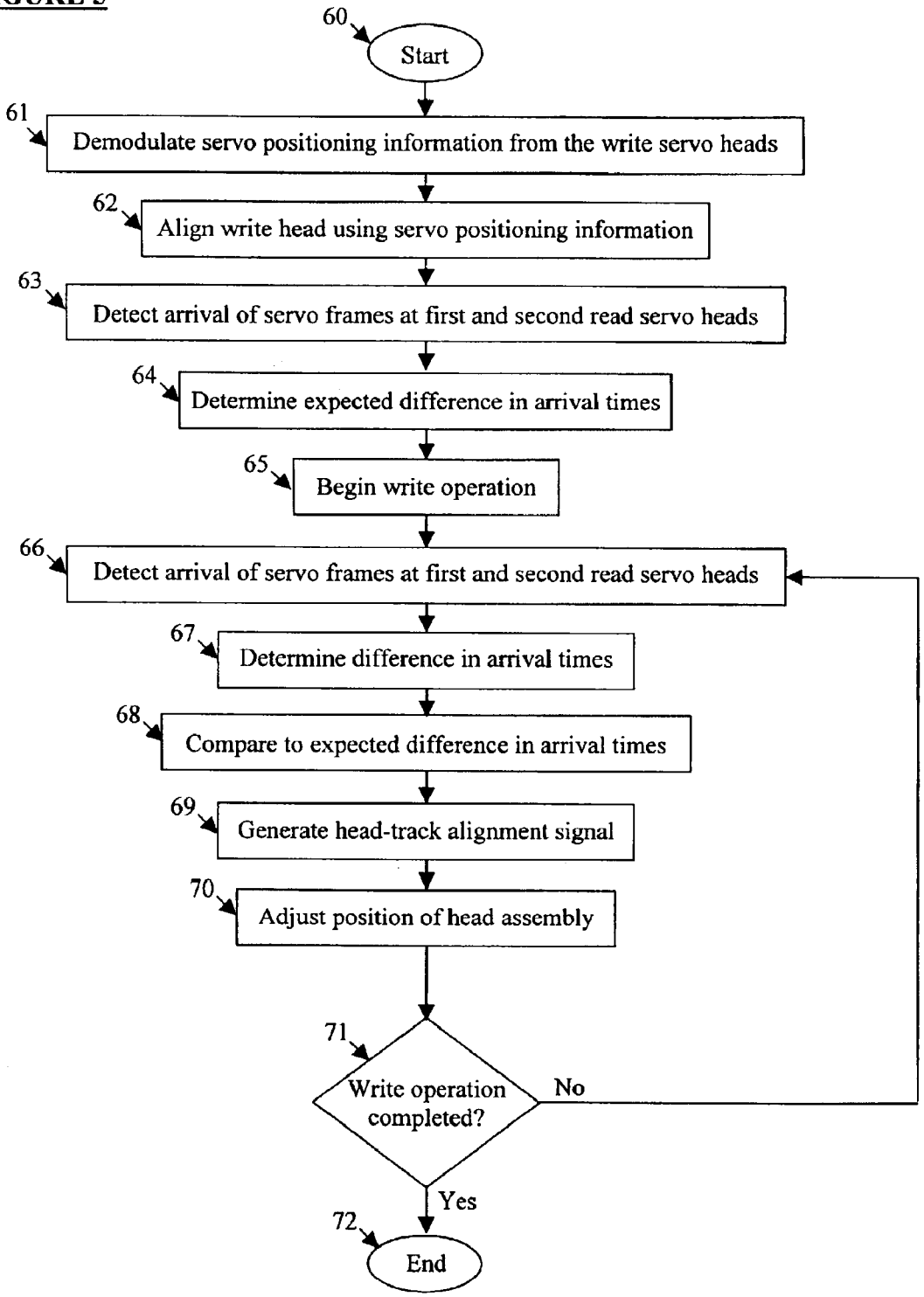

HEAD-TRACK ALIGNMENT

BACKGROUND

Tape drives may be used to store computer data or information. In many tape drives, the information or data is stored on the tape in "tracks." Tracks generally extend linearly along the length of the tape. A head assembly positioned near the tape typically writes to or reads from the tracks on the tape. As used herein, "accessing" information on a tape refers inclusively to reading or writing information on a tape. As the tape is transported across the head assembly, the information can be accessed as desired.

With the increasing reliance on computerization in all aspects of our lives, there is an increasing need for additional storage capacity. Accordingly, new generations of tape drives have increased storage capacity. In part, this increased capacity has been accomplished by using increasingly smaller track spacing between the tracks. As the track spacing decreases, the tape drive's tolerance for misalignment of the tape with respect to the head assembly of the tape drive also decreases. Accordingly, a smaller misalignment can actually cause accessing (reading from or writing to) an improper track on the tape.

Misalignment of the tape with the head assembly can be caused by tape tilt. Tape tilt may be characterized by the tape moving across the head assembly at an angle relative to the head assembly. Physical tolerances in the tape or the tape drive often cause tape tilt. For example, guide rollers in the tape drive are generally used to guide the tape across the head assembly. If these guide rollers are even slightly larger than the width of the tape, the tape may become angled just by changing position within the guide rollers. Accordingly, tape tilt can change while accessing the tape.

BRIEF SUMMARY

Head-track alignment is disclosed for compensation of tape tilt. An embodiment of the system comprises a head assembly capable of detecting arrival of servo frames in a first and second servo track of a tape. An alignment processor couples to the head assembly and generates a head-track alignment signal based on a comparison of the arrival times of the servo frames in the first and second servo tracks.

BRIEF DESCRIPTION OF THE DRAWINGS

For a detailed description of the embodiments of the invention, reference will now be made to the accompanying drawings in which:

FIG. 5 is a flow chart illustrating a methodology for head-track alignment to compensate for tape tilt.

NOTATION AND NOMENCLATURE

Certain terms are used throughout the following description and claims to refer to particular components. As one skilled in the art will appreciate, components may be referred to by different names. This document does not intend to distinguish between components that differ in name, but not function. In the following discussion and in the claims, the terms "including" and "comprising" are used in an open-ended fashion, and thus should be interpreted to mean "including, but not limited to." Also, the term "couple" or "couples" is intended to mean either an indirect or direct electrical or communicative connection. Thus, if a first device couples to a second device, that connection may be through a direct connection, or through an indirect connection via other devices and connections. The term "data" broadly includes data, software, or other types of information stored on a tape.

DETAILED DESCRIPTION

The following discussion is directed to various embodiments of the invention. The embodiments disclosed should not be interpreted, or otherwise used, as limiting the scope of the disclosure or claims. In addition, one skilled in the art will understand that the following description has broad application. The discussion of any embodiment is meant only to be exemplary of that embodiment and is not intended to limit the scope of the disclosure or the claims to that embodiment. In this disclosure, numerous specific details may be set forth to provide a sufficient understanding of the embodiment. However, those skilled in the art will appreciate that the invention may be practiced without such specific details. In other instances, well-known elements may have been illustrated in schematic or block diagram form in order not to obscure the disclosure in unnecessary detail. Additionally, some details may have been omitted where such details were not considered necessary to obtain a complete understanding of the embodiment, and are considered to be within the understanding of persons of ordinary skill in the relevant art. It is further noted that all functions described herein may be performed in either hardware or software, or a combination thereof, unless indicated otherwise.

Figure 1:
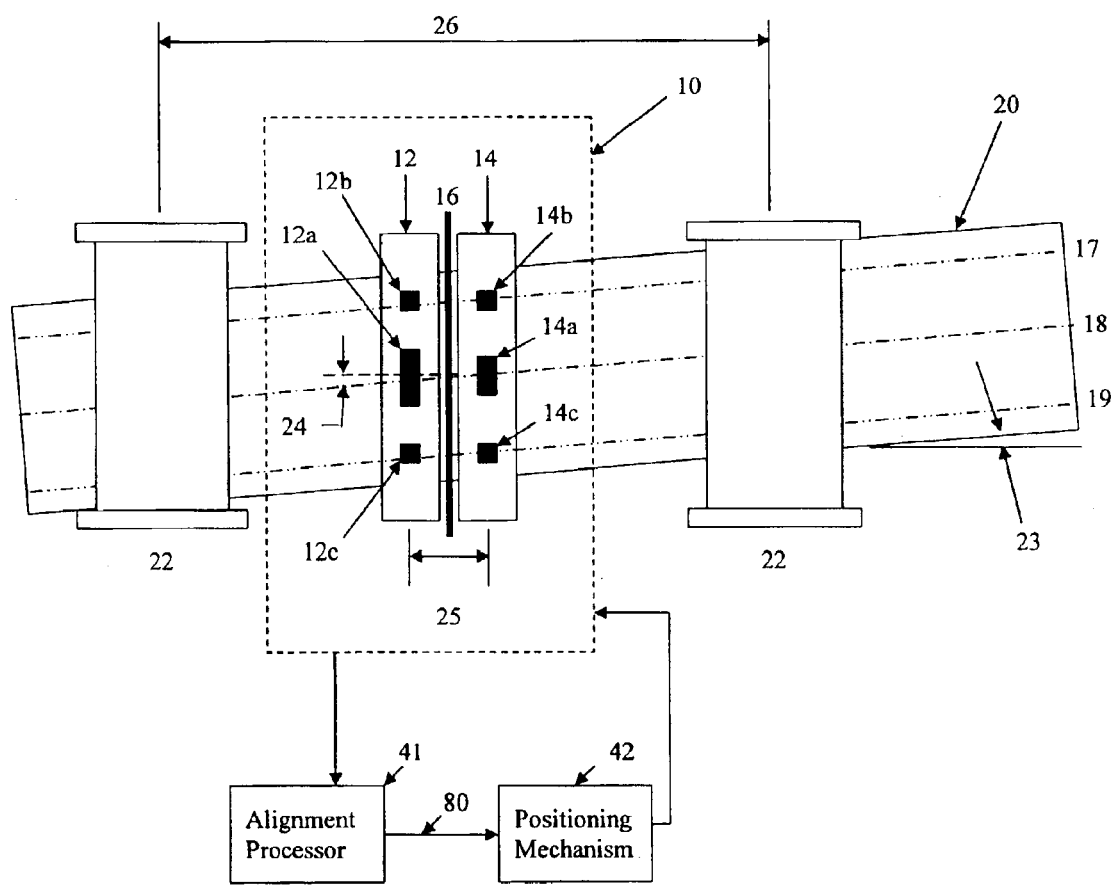
FIG. 1 is a system diagram of a tape drive incorporating a head-track alignment system for compensation of tape tilt.

Referring initially to FIG. 1, a tape drive includes tape guide rollers 22, a head assembly 10, an alignment processor 41 and a positioning mechanism 42. The head assembly 10, the alignment processor 41, and the positioning mechanism 42 are coupled together to comprise a closed-loop for adjusting the position of the head assembly 10.

A tape 20 is shown in the tape drive of FIG. 1 for purposes of illustration. More specifically, FIG. 1 shows a tape 20 being guided past the head assembly 10 by a pair of guide rollers 22. Tape 20 may include a first servo track 17, a second servo track 19, and a data track 18. The first and second servo tracks 17,19 may be used to store servo information used for determining the position of the tape 20. The data track 18 comprises data to be accessed by the head assembly 10. Although only one data track 18 and two servo tracks 17,19 are shown in the embodiment of FIG. 1, a plurality of servo and data tracks, or other tracks, may be included as well.

Generally, the head assembly 10 of the tape drive reads from and writes to ("accesses") the tape 20. As shown in FIG. 1, the head assembly 10 comprises a write bump 12, a read bump 14, and a shield 16. Although a single write bump 12 and a single read bump 14 are shown in the embodiment of FIG. 1, a plurality of such write and read bumps may be included to operate in parallel for high-capacity tape drives. Additionally, although only one read head 14a and one write head 12a are shown, the head assembly 10 may employ a plurality of such heads all operating in parallel on each bump. Such a plurality of heads would enable the head assembly 10 to access multiple tracks on the tape 20 at a time.

The write and read portion of the head assembly 10 are commonly referred to as "bumps" since they often protrude relative to the rest of the head assembly 10 to place them in proximity with the tape. In the following disclosure and claims, however, the term "bump" should not be construed as requiring any protrusion or other physical dimension.

The read bump 14 comprises a read head 14a, a first read servo head 14b, and a second read servo head 14c. The read head 14a reads data from the tape 20. In order to read from the tape 20, the read head 14a is generally centered over the data track 18 on the tape 20. The first and second read servo heads 14b, 14c locate the servo tracks 17,19 on the tape 20. As shown in FIG. 1, the first read servo head 14b locates the top servo track 17. Similarly, the second read servo head 14c locates the bottom servo track 19. Using first and second read servo heads 14b, 14c and the servo tracks 17,19, the read bump 14 can be positioned over the data track 18 to read data from the tape 20.

Similarly, the write bump 12 comprises a write head 12a, a first write servo head 12b, and a second write servo head 12c. The write head 12a writes data to the tape 20. In order to write to the tape 20, the write head 12a is generally centered over the data track 18 on the tape 20. The first and second write servo heads 12b, 12c locate the servo tracks 17,19 on the tape 20. As shown in FIG. 1, the first write servo head 12b locates the top servo track 17. Similarly, the second write servo head 12c locates the bottom servo track 19. Using the write servo heads 12b, 12c on the write bump 12, the write head 12a can be positioned over the data track 18 to write data to the tape 20. When the write head 12a is active, however, electrical and magnetic interference from the writing operation may impinge on the write servo heads 12b, 12c. If too much interference couples into the write servo heads 12b, 12c, the heads may not be used reliably to locate the servo tracks 17,19. As a result, the write servo heads 12b, 12c may be unusable during writes. Accordingly, the write servo heads 12b, 12c may be unusable to locate the write head 12a for writing data to the tape 20.

By installing a shield 16 between the write bump 12 and read bump 14, however, the interference or noise from the writing operation can be sufficiently isolated from the read bump 14 (or other surrounding bumps in other embodiments). The isolation provided by the shield 16 allows the read servo heads 14b, 14c to locate the servo tracks, 17, 19 and thus position the head assembly 10 over the data track 18 to be written. Thus, the read servo heads 14b, 14c can be used to position the write head 12a even during a write operation.

Using the read servo heads 14b, 14c to position the write head 12a, however, creates additional complexity. This complexity arises because the read servo heads 14b, 14c are displaced a significant distance from the write head 12a. In particular, the first and second read servo heads 14b, 14c are laterally displaced from the write head 12a in a direction generally parallel to the normal transport path of the tape. As a result, if there is tape tilt, the read servo heads 14b, 14c may be centered on the top and bottom servo tracks 17, 19, while the write head 12a may not be exactly centered on the data track 18. This situation is illustrated in FIG. 1.

As shown in FIG. 1, the position of tape 20 has shifted along the tape guide rollers 22 to run along the end flanges of the guide rollers 22. The result is that the tape 20 is tilted with respect to the head assembly 10. The tape tilt angle is shown with respect to a reference line at 23. In addition, the tape tilt can be seen in reference to the tape guide rollers 22. In this illustration, the tape tilt arises because the outer flanges of the tape guide rollers 22 are wider than the tape itself. The tape tilt angle 23 is related to the width of the roller guides 22 as well as the distance 26 between the roller guides 22. In particular, the greater the width of the roller guides 22 (i.e., width between end flanges of the roller guides 22) the greater the potential tape tilt angle 23. Conversely, the smaller the distance 26 between the roller guides 22, the greater the potential tape tilt angle 23. To provide reliable performance even in view of manufacturing tolerances, however, the guide rollers 22 are generally made slightly wider than the tape 20 so that the tape 20 will not be pinched and will run smoothly even when the widest tape 20 and narrowest rollers 22 are present.

Since FIG. 1 illustrates tape tilt occurring, the first and second read servo heads 14b, 14c are aligned with the top and bottom servo tracks 17, 19, while the write head 12a is not aligned with the centerline of the data track 18. This misalignment would occur when there is tape tilt and the read servo heads 14b, 14c have been used to position the head assembly 10. This misalignment is shown with respect to a reference line at 24. The misalignment is directly related to the distance 25 between the write bump 12 and the read bump 14. The greater this distance 25, the greater the displacement of the read servo heads 14b, 14c with respect to the write head 12a. The greater the displacement, the greater the potential misalignment 24 which results from tape tilt angle 23. Accordingly, the farther away the write head 12a is from the read servo heads 14b, 14c used to position the head assembly, the greater the resulting misalignment 24 of the write head 12a to the data track 18. To effectively use the read servo heads 14b, 14c to position the write head 12a, then, requires compensation for this potential misalignment resulting from tape tilt.

The alignment processor 41 and the positioning mechanism 42 control the positioning of the head assembly 10. The alignment processor 41, the positioning mechanism 42, and the head assembly form a closed loop. This loop is generally used to align the head assembly 10 with the data track 18 to be accessed on the tape 20. In the embodiment of FIG. 1, the head assembly 10 reads the positioning information from the servo tracks 17,19. The positioning information is then coupled to the alignment processor 41. The alignment processor 41 then generates a head-track alignment signal 80 that is coupled to the positioning mechanism 42. Based on the head-track alignment signal 80, the positioning mechanism 42 adjusts the position of the head assembly 10 relative to the tape 20. The positioning performed by the positioning mechanism 42 could comprise linear adjustments, for instance adjustments in a linear direction along the width of the tape or in any direction in a plane parallel to the plane of the tape. Alternatively, the positioning could be angular where the adjustments to the position of the head assembly comprise pivotal adjustments about an axis substantially perpendicular to the plane of the tape. The positioning could also include both a linear and an angular adjustment. The adjustments compensate for misalignment of the head assembly 40 and desired tape track that may be caused by tape tilt or other causes. Thus, by using certain information in the servo tracks 17, 19 the closed loop can be used to compensate for tape tilt as well as other positioning misalignments. In particular, by using servo frames in the servo tracks 17, 19, tape tilt can be measured and compensated. Servo frames are discussed in relation to FIG. 2 below.

Further detail of an embodiment of the alignment processor 41 and the positioning mechanism 42 will be discussed in relation to FIG. 3 below.

Figure 2:
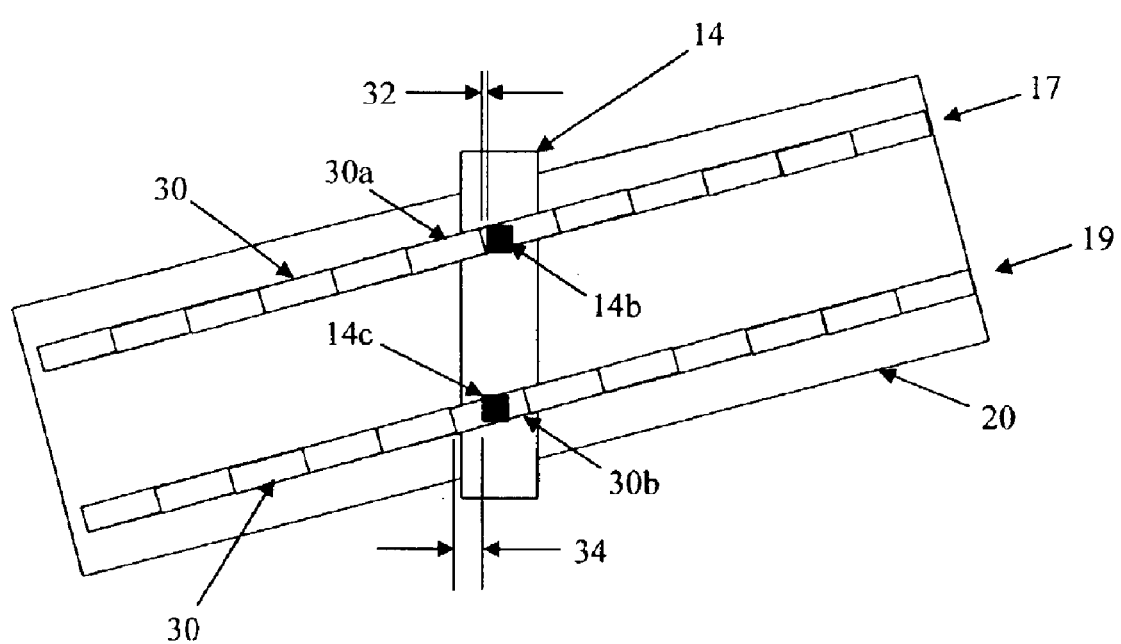
FIG. 2 is a diagram illustrating a technique in which the arrival times of servo frames can be used to determine tape tilt.

FIG. 2 provides an illustration of how the arrival times of servo frames 30 can be used to determine tape tilt. More specifically, FIG. 2 shows the tape 20 moving across the read bump 14 at an exaggerated angle, wherein the tape 20 has a first servo track 17 and a second servo track 19. For clarity, only the read bump 14 of the head assembly is shown since the servo heads 14b, 14c on the read bump 14 would be used to read the servo tracks in this embodiment. Also shown are servo frames 30 in each servo track 17,19.

The servo frames 30 may comprise discrete units or segments of the servo tracks 17,19 whose arrival at the servo heads 14b, 14c can be determined. As discussed above, servo tracks 17,19 are generally used to determine location on the tape in a direction across the width of the tape 20 by aligning the servo heads 14b, 14c with the servo tracks 17, 19. Servo frame 30 information in the servo tracks 17,19 can provide location information in a direction along the length of the tape 20. In FIG. 2, rectangular segments within the servo tracks 17,19 demarcate the servo frames 30 in the servo tracks 17, 19. These demarcations illustrate the servo frame 30 information on the servo tracks 17, 19. The demarcations/segments for the servo frames 30 as well as the servo tracks 17, 19 are illustrative only and should not be construed as requiring any physical feature on the tape 20. While the particular term "servo frame" is used herein, there may be many different types of distinguishing features inherent in the servo tracks that could be used for the purpose of measuring the relative arrival times at the two servo heads. As used herein, the term "servo frame" should be understood to encompass any distinguishing feature on the servo tracks that can be identified in a manner that allows a relative measurement of arrival times at the servo heads to be performed.

In the embodiment shown in FIG. 2, the servo frames 30 on the first and second servo tracks 17, 19 are aligned such that if the tape 20 were running exactly horizontal, the servo frames 30 in each track 17, 19 would arrive at the servo heads 14b, 14c at the same time. If the tape 20 tilts, then there would be a difference in arrival times of the servo frames 30 at the servo heads 14b, 14c. As shown in FIG. 2, the start of a servo frame 30a is just arriving at the first read servo head 14b as indicated by measurement 32. At the same time, the start of the corresponding servo frame 30b has already passed the second read servo head 14c and the end of the servo frame 30b is approaching as indicated by measurement 34. By measuring the difference in arrival times of corresponding servo frames 30a, 30b in the first and second servo tracks 17, 19, the angle of tape tilt can be determined. Of course, corresponding servo frames 30 opposite each other in the servo tracks 17,19 should be used as well as corresponding portions of the frames 30 (such as the start or end of both servo frames 30a, 30b on the servo tracks 17, 19). More specifically, by knowing the speed of the tape ($V_{tape}$), difference in arrival times ($\Delta t$), and distance between the servo heads 14b, 14c ($S_d$), the tilt angle can be determined. An embodiment of this calculation would be:

$$\text{Tilt angle} = \text{ArcSin}((V_{tape} * \Delta t)/S_d)$$

The tilt angle equals the inverse sine of the speed of the tape multiplied by the difference in arrival times and divided by the distance between the servo heads. With this information, a closed loop servo system in the tape drive could be used to compensate for the tilt angle by repositioning the head assembly. An embodiment of such a system is described more fully below in relation to FIG. 3.

By using servo frames 30 in the servo tracks 17, 19, the tilt angle can be determined while the tape 20 is moving. Thus, the tilt angle can be determined and compensated for in real time as the servo frames 30 arrive. Moreover, by using the read servo heads 14b, 14c the tilt angle can even be determined while writing to the tape 20. By knowing the displacement of the write head 12a from the read bump 14, the alignment of the write head can be compensated while writing. More specifically, the write head 12a can be centered over data track 18 even in the presence of tape tilt by using the information from the read servo heads 14b and 14c. Additionally, the write servo heads 12b and 12c on the write bump 12 could be used while reading data from the read head 14a. Similarly, by knowing the displacement of the read head 14a from the write bump 12, and by using the tape tilt as measured by the write servo heads 12b and 12c, the read head 14a could be centered over data track 18 even in the presence of tape tilt. Similarly, any read/write head could be positioned using servo heads from other bumps on the head assembly.

Figure 3:
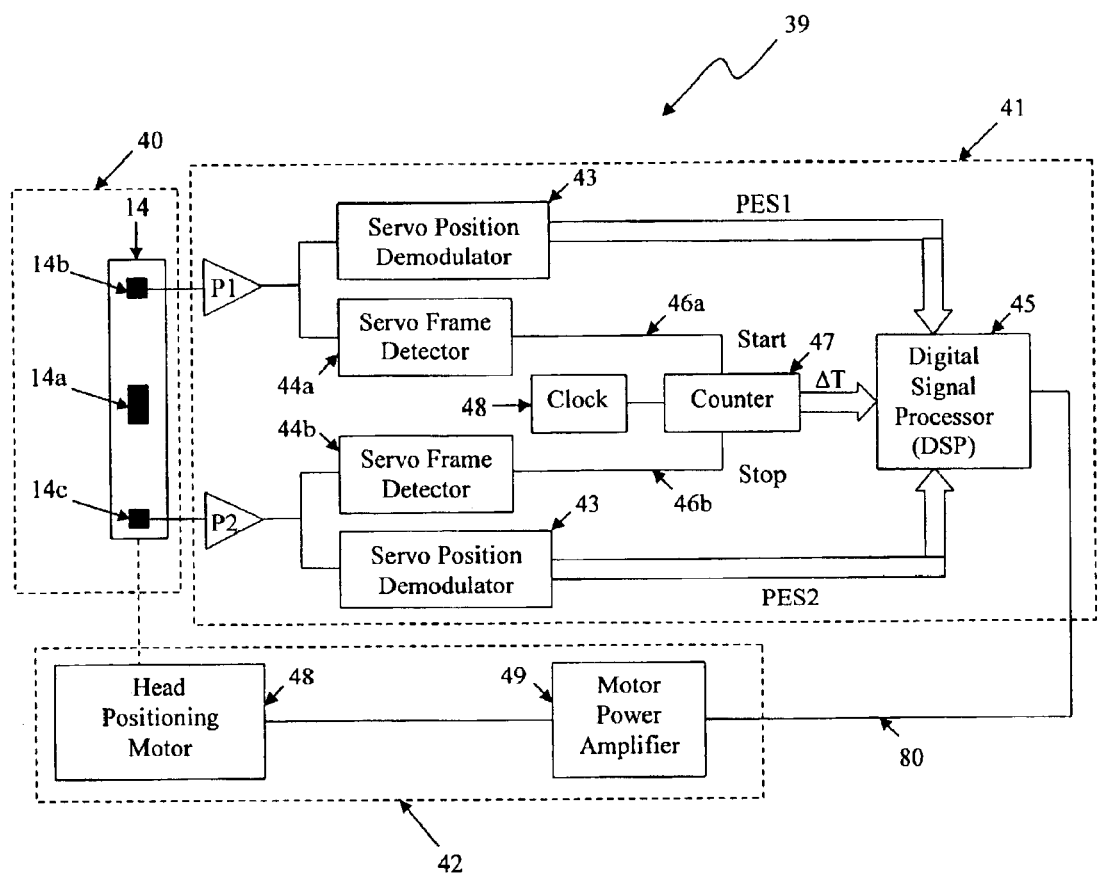
FIG. 3 is a system diagram showing a head-track alignment system for compensation of tape tilt.

FIG. 3 is a system diagram showing an embodiment of a head-track alignment system 39 for compensation of tape tilt. For simplicity, only the read bump 14 is shown in this drawing. The write bump 12 would be physically coupled to the read bump but is not shown in this drawing. The embodiment of the alignment system 39 shown in FIG. 3 is essentially a closed loop servo system typically used in a tape drive to align the head assembly using servo track information. This embodiment of the system 39, however, has additional components added to also compensate for tape tilt. More specifically, FIG. 3 shows a head assembly 40, an alignment processor 41, and a positioning mechanism 42. The head assembly 40 is coupled to the alignment processor 41. The alignment processor is coupled to the positioning mechanism 42. Finally, the positioning mechanism 42 is coupled to the head assembly 40 to close the loop for the system 39.

FIG. 3 shows the read bump 14 of the head assembly 40 since in this embodiment the read bump 14 includes the heads used to read the servo track information from the tape. The read bump 14 comprises a read head 14a, a first read servo head 14b, and a second read servo head 14c. As previously discussed, the servo heads 14b, 14c read the servo information from the servo tracks on the tape. The servo signals from the read servo heads 14b, 14c are coupled to the alignment processor 41 for processing of the servo information.

The alignment processor 41 may first perform signal processing on the servo signals to ensure or improve the accuracy of the servo signals and the servo information embedded in the signals. The signal processing may include averaging, amplifying, filtering, or other known signal processing techniques. In the embodiment of FIG. 3, the servo signals are coupled to preamp circuits P1, P2 to amplify and filter the signals. From the preamp circuits P1, P2, each signal couples to a servo position demodulator 43 and a servo frame detector 44. The servo position demodulators 43 read the servo information from the servo signals and generate a position error signal PES1 (based on the information from the first read servo head 14b) and PES2 (based on the information from the second read servo head 14c). These signals are coupled to a digital signal processor (DSP) 45 for further processing and to determine the necessary positioning adjustments required to align the head assembly of the tape drive with the desired track on the tape. The DSP generates a head-track alignment signal 80 coupled to the positioning mechanism 42 to achieve the desired positioning.

Additionally, the servo frame detectors 44 also process the servo information from the servo signals. In particular, in this embodiment of the system 39, the servo frame detectors 44 identify transitions between servo frames to determine the arrival of the frames at the head assembly, and more specifically, at the read servo heads 14b, 14c. The servo frame detectors 44 generate a signal indicative of each frame's arrival. The first servo frame detector 44a generates a first signal 46a representing the arrival of servo frames in the first servo track to the first read servo head 14b. Similarly, the second servo frame detector 44b generates a second signal 46b representing the arrival of servo frames in the second servo track to the second read servo head 14c. The first and second signal 46a, 46b couple to a counter 47 that is incremented by a high-speed clock 48. The speed of the clock 48 should be high speed in comparison to the arrival times of the frames so that the resolution of the counter 47 is sufficient to provide an accurate determination of arrival times. Accordingly, the appropriate clock period of the clock depends on the arrival times of the frames. Of course, the arrival times of the frames depends on the speed of the tape and the distance between the frames. The clock period will generally be a relatively small fraction of the arrival times to be measured (such as 1/100, 1/1,000, 1/1,000,000 for example), to ensure that the clock period is sufficient to accurately measure the arrival times. For example, if arrival times accurate within 1/1000 of the arrival time are desired, then a clock period of at least 1/1000 of the arrival time should be used. The faster the clock speed, the shorter the clock period, and the greater the accuracy of the measured arrival times.

As shown in the embodiment of the system 39, the first signal 46a starts the counter 47 and second signal 46b stops the counter. By multiplying the count by the clock period, the amount of time that expired between the first signal 46a and the second signal 46b can be determined. This time represents the difference between the arrival of servo frames at the first read servo head 14b and the arrival of servo frames at the second read servo head 14c (Δt). The counter 47 is coupled to the DSP 45. The DSP 45 can use the counter information to determine tape tilt angle using the calculation discussed above. The DSP 45 then can determine the necessary compensation required to account for the tape tilt angle and incorporates this compensation in the head-track alignment signal 80 coupled to the positioning mechanism 42.

In the embodiment shown in FIG. 3, the positioning mechanism 42 comprises a head positioning motor 48 and motor power amplifier 49. In response to the head-track alignment signal 80, the positioning mechanism 42 adjusts the position of the head assembly 40. More specifically, the head positioning motor 48 and motor power amplifier 49 may adjust the physical position of the head assembly 40 to align the head assembly 40 with the desired tape track. The positioning could comprise linear adjustments, for instance adjustments in a linear direction along the width of the tape or in any direction in a plane parallel to the plane of the tape. Alternatively, the positioning could be angular where the adjustments to the position of the head assembly comprise pivotal adjustments about an axis substantially perpendicular to the plane of the tape. The positioning could also include both a linear and an angular adjustment. The adjustments compensate for misalignment of the head assembly 40 and desired tape track that may be caused by tape tilt or other causes.

The embodiment shown in FIG. 3 also provides for an additional use of the tape tilt measurement information. Besides using the tape tilt information to adjust the position or orientation of the head assembly 40, the system 39 could also be used to stop writing or reading (accessing) information on the tape if the tape tilt exceeds a specified threshold. Preventing a misaligned operation may prevent overwriting adjacent tracks due to a write head position error caused by tape tilt or may prevent reading from the incorrect tracks due to a read head position error caused by tape tilt. The tape drive controller could then elect to reposition the tape and retry the read/write operation again, once the tape tilt has returned to within the required limits, or once the position or orientation of the head has been properly adjusted. This approach accommodates situations where it might not be possible to adjust the position of the head assembly 40 quickly enough to respond to a sudden change in tape tilt. In the embodiment of the system 39 shown in FIG. 3, the alignment processor 41 could be coupled within the tape drive in order to prevent accessing the tape when the determined tape tilt exceeds a threshold.

Stopping a read operation may not be necessary since a read operation is generally not destructive (whereas a write operation can be destructive to the data stored on the tape). Since the information read from the track may also incorporate the track number, there is often no danger of confusing which track is being read. In addition, some tape drive systems may incorporate read-retry recovery algorithms or similar features to ensure the data is properly read. Rather than stopping read operations, however, the system and method for compensation of tape tilt disclosed herein may still be useful to allow read operations to utilize servo heads from other bumps on the head assembly, such as the write bump 12 and corresponding write servo heads 12b, 12c. As discussed, normally the read servo heads 14b, 14c would be used while reading so that the read head 14a can be accurately aligned regardless of tape tilt. If for some reason one of the read servo heads 14b, 14c fails or becomes inoperative in any way (whether by interference, noise, malfunction, defect, etc.), then the tape drive could switch to using servo heads on another bump (such as the write bump 12 using write servo heads 12b, 12c). Once the switch to the write servo heads 12b, 12c is made, the positioning of the read head 14a would need to include compensation for tape tilt. Additionally, there are other circumstances where having the ability to utilize servo heads on different bumps from the read/write head being utilized can be advantageous. Any such scenario typically introduces a displacement of the active servo heads from the active read/write head. Such a displacement results in a need for tape tilt compensation as provided herein.

Figure 4:
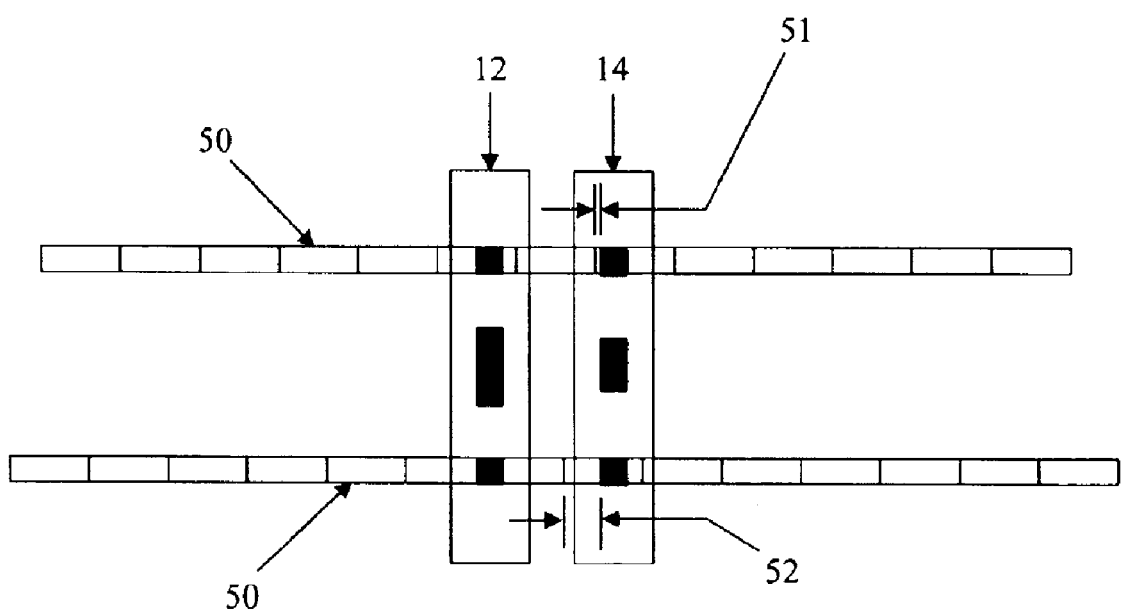
FIG. 4 is a diagram illustrating a technique for using calibration to determine the amount of preexisting offset in servo frames.

FIG. 4 is an illustration of how a calibration can be done to determine the amount of any preexisting offset in the servo frames 50. More specifically, FIG. 4 shows a head assembly comprising a write bump 12 and read bump 14, and first and second servo tracks 17,19. In this embodiment, the first servo track 17 comprises servo frames 50 that are offset with respect to the servo frames 50 of the second servo track 19. The discussion above assumed that corresponding servo frames in each servo track would be aligned such that corresponding servo frames from each servo track should arrive at the same time when there is no tape tilt. In the embodiment of FIG. 4, the servo frames 50 will not arrive at the head assembly at the same time since the frames 50 are offset. As shown in FIG. 4, the start of a servo frame 50 on the first servo track 17 is just arriving at the first read servo head 14b as indicated by measurement 51. At the same time, the start of the corresponding frame on the second servo track 19 is farther away from the second read servo head 14c as indicated by measurement 52. Thus, a difference in arrival times will occur even when the tape is aligned with the head assembly. This difference is due to the offset of the servo frames 50 in the servo tracks 17,19. The difference should not be construed as tape tilt.

Such an offset in the servo frames 50 may be from manufacturing tolerances when the tape was made, i.e., when the servo tracks 17,19 and servo frames 50 were recorded on the tape, or even tolerances in the tape drive. Alternatively, some tape formats may include servo frames 50 that are intentionally offset. Regardless of the cause, however, an offset in the servo frames 50 can be compensated by initiating a calibration process to determine the expected arrival time difference that will exist even when the head assembly is properly positioned. The calibration process can be performed prior to accessing the tape. For a write operation for example, the calibration process can be initiated just prior to beginning the write operation in order to avoid write cross talk between the write bump 12 and read bump 14. Since no write operation is active, the write head can be aligned using the write servo heads. With the write head aligned, the arrival times of the servo frames observed at the read servo heads can then be determined. Any difference in arrival times at the read servo heads can then be recorded as a normal or expected time difference. Once the write operation commences, the alignment processor can continue to monitor the arrival time difference during the write operation and compare it to the expected difference. A change from the expected time difference would indicate tape tilt. The alignment processor could then determine the compensation in the position of the head-track alignment needed to compensate for the tape tilt. The alignment processor would then generate the appropriate head-track alignment signal.

FIG. 5 is a flow chart illustrating an embodiment of a head-track alignment method for compensation of tape tilt. The method starts at box 60. This embodiment of the method is directed to compensation of tape tilt during a write operation. A similar method could be used for read operations or other operations. Accordingly, the teaching provided by this disclosure should not be limited to just write operations. This embodiment of the method also includes a calibration process to determine any normal offset for the servo frames in the servo tracks arriving at the head assembly. The head positioning information in the servo tracks is detected and demodulated using the write servo heads as indicated in box 61. In box 62, the write head is then aligned based on this servo information. A closed-loop servo alignment or positioning system such as the one described herein in relation to FIG. 3 above may be used to align the head. With the write head aligned, arrival of servo frames or similar servo information can be detected at the first and second read servo heads in box 63. Again two servo heads reading two servo tracks is assumed for this embodiment; however, any number of such tracks could be used in a given embodiment without departing from the scope of this disclosure. The difference in arrival times of the servo frames to the first read servo head versus the arrival times of the servo frames to the second read servo head is determined and recorded as an expected difference in arrival times in box 64. As discussed herein, this expected difference allows for an offset of the servo frames even when the head is accurately aligned.

With the calibration process complete, the write operation begins in box 65. In box 66, the arrival of servo frames at the first and second read servo heads is detected. The servo frames are read from the read servo heads instead of the write servo heads since the interference might make detection of the servo information by the write servo heads unreliable. In box 67, the difference in arrival times for the servo frames at the first and second read servo heads is determined. In box 68, this difference is then compared to the expected arrival times determined from the calibration process. A difference in arrival times from the expected arrival times indicates tape tilt that should be compensated. In box 69, the head-track alignment signal is generated so that the position of the head assembly can then be adjusted in box 70. Again, this adjustment may be linear in a plane parallel to the plane of the tape or pivotal about an axis substantially perpendicular to the plane of the tape. The adjustments may be carried out by a positioning mechanism such as the embodiment shown and described in relation to FIG. 3 above.

In box 71, the method checks to see if the write operation has been completed. If not, then the method returns to box 66 to continue detecting the arrival of servo frames at the read servo heads, and the process in boxes 66–71 repeats until the write operation is complete. This reiterative process allows for dynamic compensation for misalignment of the tape and head that may be performed continuously throughout the write operation. The recurring compensation is particularly useful for tape tilt since tape tilt often changes as the operation is performed. Accurately positioning the head at the beginning of the operation would not account for changes during the operation. Once the write operation is complete, the method ends at box 72.

The above discussion is meant to be illustrative of the principles and various embodiments of the present invention. Numerous variations and modifications will become apparent to those skilled in the art once the above disclosure is fully appreciated. For example, the head-track alignment system and method for compensation of tape tilt may at times incorporate more or less components or functions than the embodiments described herein. This disclosure makes those principles and modified embodiments apparent to those skilled in the art. The following claims should be interpreted to embrace all such variations and modifications.

What is claimed is:

1. A head-track alignment system, comprising:
   a head assembly capable of detecting arrival of servo frames in a first and second servo track of a tape; and
   an alignment processor coupled to the head assembly generating a head-track alignment signal based on a comparison of the arrival times of the servo frames in the first and second servo tracks to expected arrival times;
   wherein the head-track alignment signal can be generated while accessing the tape.

2. The system of claim 1 further comprising:
   a positioning mechanism responsive to the head-track alignment signal to make adjustments to the position of the head assembly.

3. The system of claim 2 wherein the adjustments to the position of the head assembly occur reiteratively while accessing the tape.

4. The system of claim 2 wherein the adjustments to the position of the head assembly comprise pivotal adjustments about an axis substantially perpendicular to the tape.

5. The system of claim 2 wherein the adjustments to the position of the head assembly comprise linear adjustments in a direction perpendicular to the transport path of the tape.

6. The system of claim 1 wherein the head assembly comprises:

a write bump having a write head to write data to a tape; and a read bump having a read head to read data from the tape, a first read servo head to read from the first servo track, and a second read servo head to read from the second servo track;

wherein the information is read from the first and second servo tracks by the first and second read servo head respectively, while the write head is writing to the tape.

7. The system of claim 6 wherein the write bump comprises a write head to write data to a tape, a first write servo head to read from the first servo track, and a second write servo head to read from the second servo track.

8. The system of claim 6 wherein the writs bump is shielded from the read bump to reduce noise in the first and second read servo heads while the write head is writing to a tape.

9. The system of claim 1 wherein the alignment processor further comprises:

a first servo frame detector that detects the arrival of servo frames in the first servo track and generates a first signal; and a second servo frame detector that detects the arrival of servo frames in the second servo track and generates a second signal.

10. The system of claim 9 wherein the alignment processor uses the first and second signals to determine the difference in arrival times of the servo frames in the first and second servo tracks.

11. The system of claim 9 wherein the alignment processor further comprises:

a counter; and a DSP coupled to the counter;

wherein the DSP uses the counter, the first signal, and the second signal to determine tape tilt and to generate the appropriate head-track alignment signal to adjust the position of the head assembly based on the determined tape tilt.

12. The system of claim 1 wherein the alignment processor performs signal processing to improve accuracy of the determined arrival times for servo frames in the first and second servo tracks.

13. The system of claim 1 wherein the expected arrival times are determined using a calibration process initiated prior to accessing the tape.

14. A head-track alignment system, comprising:

a head assembly capable of detecting arrival of servo frames in a first and second servo track of a tape; and an alignment processor coupled to the head assembly generating a head-track alignment signal based on a comparison of the arrival times of the servo frames in the first and second servo tracks, wherein the head-track alignment signal can be generated while accessing the tape, and wherein the alignment processor further comprises:

a first servo frame detector that detects the arrival of servo frames in the first servo track and generates a first signal;

a second servo frame detector that detects the arrival of servo frames in the second servo track and generates a second signal;

a counter; and a DSP coupled to the counter, wherein the DSP uses the counter, the first signal, and the second signal to determine tape tilt and to generate the appropriate head-track alignment signal to adjust the position of the head assembly based on the determined tape tilt, and wherein the first signal starts the counter; the second signal stops the counter to establish a count; the counter is incremented by a clock having a clock period; the count is multiplied by the clock period to determine a time difference in the arrival times of the first and second servo frames; and the time difference is used to determine tape tilt.

15. The system of claim 14 wherein the time difference is compared to an expected time difference to determine tape tilt.

16. A head-track alignment method, comprising:

determining tapes tilt with respect to a head assembly of a tape drive while accessing a tape; and compensating for the tape tilt, wherein determining tape tilt with respect to a head assembly of a tape drive while accessing a tape comprises;

comparing arrival times of servo frames in a first and second servo track of a tape; and determining the tape tilt from a comparison of arrival times, wherein comparing arrival times of servo frames in a first and second servo track of a tape comprises:

detecting arrival at the head assembly of servo frames in the first and second servo track of a tape;

determining the difference between arrival times of servo frames in the first servo track and arrival times of servo frames in the second servo track; and comparing the difference between arrival times to an expected difference in arrival times of servo frames in the first and second servo track.

17. The method of claim 16 further comprising:

performing a calibration process prior to accessing a tape to determine the expected difference in arrival times of servo frames in the first and second servo track.

18. A tape drive, comprising:

a head assembly capable of detecting arrival of servo frames in a first and second servo track of a tape;

an alignment processor coupled to the head assembly generating a head-track alignment signal based on a comparison of an expected time difference to a difference in the arrival times of the servo frames in the first and second servo tracks; and a positioning mechanism responsive to the head-track alignment signal to make adjustments to the position of the head assembly while the tape drive is accessing the tape.

19. The tape drive of claim 18 wherein the adjustments to the position of the head assembly comprise pivotal adjustments about an axis substantially perpendicular to the tape.

20. The tape drive of claim 18 wherein the adjustments to the position of the head assembly comprise linear adjustments in a direction perpendicular to the transport path of the tape.

21. The tape drive of claim 18 wherein the head assembly comprises a plurality of bumps to access the tape and wherein the servo frames are detected by a first bump while a second bump accesses the data on the tape.

22. The system of claim 21 wherein the first bump is shielded from the second bump to reduce noise between the bumps.

* * * * *

UNITED STATES PATENT AND TRADEMARK OFFICE
CERTIFICATE OF CORRECTION

PATENT NO. : 6,937,425 B2  Page 1 of 1
APPLICATION NO. : 10/464102
DATED : August 30, 2005
INVENTOR(S) : Vernon L. Knowles et al.

It is certified that error appears in the above-identified patent and that said Letters Patent is hereby corrected as shown below:

In column 11, line 14, in Claim 8, delete "writs" and insert -- write --, therefor.

In column 12, line 15, in Claim 16, delete "tapes" and insert -- tape --, therefor.

Signed and Sealed this

Ninth Day of November, 2010

David J. Kappos
*Director of the United States Patent and Trademark Office*